United States Patent [19]
Gerwin

[11] 3,768,920
[45] Oct. 30, 1973

[54] MULTI-FLOW AIR BLOWER FOR FUEL OPERATED MOTOR VEHICLE HEATERS

[75] Inventor: Reinhard Gerwin, Stuttgart-Ost, Germany

[73] Assignee: J. Eberspacher, Esslingen/Neckar, Germany

[22] Filed: July 12, 1972

[21] Appl. No.: 271,126

[30] Foreign Application Priority Data
July 14, 1971 Germany............P 21 35 093.6

[52] U.S. Cl............... 415/148, 415/213 T, 415/150
[51] Int. Cl........................ F04d 27/00, F04d 7/02
[58] Field of Search.................. 415/150, 148, 151, 415/213 T, 53 T, 159

[56] References Cited
UNITED STATES PATENTS
| | | | |
|---|---|---|---|
| 2,051,080 | 8/1936 | Frederick | 415/53 T |
| 3,279,385 | 10/1966 | Suzuki | 415/150 |
| 3,395,853 | 8/1968 | Zoehfeld | 415/148 |
| 3,375,970 | 4/1968 | Zoehfeld | 415/148 |
| 3,658,444 | 4/1972 | Rhodes et al. | 415/213 T |

Primary Examiner—Henry F. Raduazo
Attorney—David Toren et al.

[57] ABSTRACT

A multi-flow air blower for a motor vehicle heater is provided with a housing having a cover member defining a flow channel for air passage through the blower. A bladed impeller located within the housing operates to drive through the blower and into the channel defined by the cover member. A plurality of transversely extending web plates are provided within the cover member with the webs being positioned to define on either side thereof an air inlet opening and an air outlet opening. Slidable switching means operatively associated with said webs are actuated between a first and a second position in order to selectively open or close the inlet and outlet openings defined by the webs thereby enabling selection of the number of air flow paths with which the blower is operated.

9 Claims, 9 Drawing Figures

Patented Oct. 30, 1973

Patented Oct. 30, 1973  3,768,920

MULTI-FLOW AIR BLOWER FOR FUEL OPERATED MOTOR VEHICLE HEATERS

BACKGROUND OF THE INVENTION

The present invention relates generally to combustion air blowers, and more particularly to a blower structure which is advantageously suited for use in delivering combustion air to motor vehicle heaters. The invention is particularly adapted to provide a blower wherein a selective number of air flow channels may be provided in order to overcome certain problems and obstacles frequency encountered with prior art configurations for such blowers.

In the type of heaters with which the present invention is intended to be used, problems are frequently encountered as a result of undesired pulsations occurring in the combustion process which occurs within the heater. In such heaters, the structural components which define the combustion chamber, the heat exchanger and similar parts, together with the flow lines carrying combustion air and exhaust gas, tend to function as acoustically oscillating structures. Thus, pulsations are caused in such heaters by minor unavoidable unsteadiness in the combustion process. In view of the space limitations within which such heaters must operate, and because of the necessity for uniformity in the combustion mixture, turbulent combustion with high gas velocities tends to occur during heater operation. Accordingly, the vibrations and pulsations which take place can be quite severe and troublesome.

When relatively short pipe lines are used, very high dynamic alternating pressures tend to occur because of a resonance build-up. At times the resonance may be in the range of two decimal powers above the mean static pressure in the combustion chamber, thereby rendering operation of the heater quite difficult and sometimes impossible.

Effective control of such pulsations by acoustical tuning means is possible only in exceptional cases in view of the high oscillating energies which occur as a result of the resonance in the heater. Injector-type interruptors in the exhaust pipe behind the heater have been proposed but such a measure is undesirable for safety reasons. Therefore, it becomes necessary to provide a combustion air blower which is operable with a sufficiently steep delivery characteristic curve and which can provide a large enough output with relatively low power consumption and with convenient space-saving outer dimensions.

It has been found that a steep delivery characteristic curve enables the heater to operate with acoustical pulsations occurring in the course of the combustion process only from minor changes in the combustion rate. With such a steep delivery characteristic curve, the combustion air blower is able to provide a high internal resistance having the effect of avoiding a marked rise in the resonance which occurs even in the case where the frequency of the pulsations may be equal to one of the numerous natural resonant frequencies of the heater. An additional expedient which has been proposed to overcome the beforementioned problems is the use of cell pumps of delivery of combustion air, but it has been found that this approach presents considerable operating disadvantages inasmuch as such blowers comprise parts which are in contact with each other and which may freeze together in case of water condensation at low temperatures. Additionally, such units involve undesirable cost and expense, particularly in the larger sizes thereof, and their efficiency and life expectancy are so disadvantageous that their use can offset any advantage which may be derived from the steep delivery characteristic curve with which they operate. If the efficiency of such cell pump, or displacement type radial blowers, is to be increased then there is required exacting limitations in the manufacture of the impellers and the guide means utilized therein and their construction becomes so complicated that mass production is rendered impossible because of the high cost factor involved. In order to obtain a sufficiently steep delivery characteristic curve in such units, a large number of stages are required and these blowers would involve the serious disadvantage of occupying too much space or, alternatively being operated at high speeds which would be unacceptable due to the resulting noise.

It has been found that side channel blowers are of a type most likely to have the properties that are required for trouble-free operation of fuel-operated heaters for motor vehicles. Such blowers have a delivery characteristic curve which is sufficiently steep even at relatively low speeds, and they can overcome high static back pressures in a single stage despite relatively small physical dimensions. Additionally, such blowers are simple in design and thus suitable for mass production techniques.

However, it has been found that presently known specific designs for blowers of the side channel type involve relatively low delivery characteristic curves and rather high pressure characteristics, although their delivery characteristics are found to be steeper than in the case of radial flow blowers of the same size and speed. In the case of one prior art design for a side channel blower, the arrangement involved requires a very high working point on the delivery characteristic curve, which in turn leads to an increase in power requirements.

It has been found that a blower of the side channel type can be designed as a multi-flow or double flow blower, and that as a result its delivery capacity increases in correspondence with the number of flow paths provided. Simultaneously, the maximum obtainable pressure decreases, with the number of flow paths involved operating as a factor in the steepness of the delivery characteristic curve which is substantially inversely proportional with the square thereof. It was found, for example, that a double flow side channel blower produces a sufficiently steep delivery characteristic curve even at relatively low speeds to positively avoid a resonance rise of undesired pulsations and that it is capable of providing an unexpectedly large output with good efficiency and with reduced physical dimensions.

Accordingly, the present invention is directed to overcoming the problem of providing a multi-flow blower wherein the aforementioned disadvantages are eliminated and wherein a greater output may be achieved with advantageous space limitation characteristics. In such a blower, a plurality of flow paths may be provided each with separate input and output openings with each separate flow path operating at different working points on the delivery characteristic curve independently of other flow paths. A side channel blower with the these features also involves the particular advantage that it can be manufactured more compactly without necessitating the use of two or more additional blowers, thereby providing advantageous space limitation features, greater economy and lower cost. A further advantage arises in that several, preferably two, independent suitably connected precombustion chambers, or alternatively a single precombustion chamber, may be fed to zones of the heater arranged in different spacial locations or with different pressure and temperature conditions, with the different flow paths of the combustion air being then combined ahead of the mixture formation zone, or behind this zone, or led off separately.

SUMMARY OF THE INVENTION

Briefly, the present invention may be described as an air blower of the side channel type comprising a housing within which there is mounted a bladed impeller for delivering air flow through the blower. A cover member is operatively associated with said housing to form a portion of the channel means through which the air flows. The invention is particularly characterized in the means whereby the cover member is formed with a plurality of flow paths with each flow path defining an inlet and an outlet opening. Transversely extending web means located in the cover member operate to separate each inlet opening from an adjacent outlet opening. Each of the flow paths may be cut off by selective movement of interruptor means which are operatively mounted with the cover member and which may be switched between a first and a second position to cut off a desired flow path.

In the specific embodiments of the present invention described herein, blowers involving only two flow paths are described, but it will be understood that a greater number of flow paths can be provided within the knowledge of those skilled in the art.

In a first embodiment of the invention a slidable plate is arranged for movement relative to the transverse web means which may be actuated to cover the web means thereby diverting flow around the web means so that only one flow path will be in operation.

In a second embodiment of the invention the web means is slidably mounted together with a plate member which forms an air flow diverting channel. In a first position the web means will define on either side thereof an inlet and an outlet opening for a second flow path. In a second position, the web means are moved out of the air flow path and the plate means enables air flow through the cover member in a manner whereby a single flow path is in operation.

An advantage of the invention results from the fact that an arrangement may be constructed wherein the inlet openings are arranged at a location in the flow channel which is remote from the axis of rotation of the impeller means, with the outlet openings being arranged in the channel wall facing the axis of rotation. This expedient of design provides the advantage that the dimensions of the blower can be made smaller with shorter guides being provided for the individual parts.

In accordance with another advantageous feature of the invention it was found that smoother and more trouble-free guidance of the flow to be delivered could be achieved by locating the inlet openings in the channel section facing the axis of rotation with the outlet openings being placed more remotely therefrom.

Accordingly it will be seen that some selectively is enabled with regard to the locations of the inlet and outlet openings of the individual flow paths thereby avoiding longer lengths for the flow paths.

Thus, in accordance with the present invention it becomes possible to vary the number of flow paths provided during the operation of the invention in a relatively simple manner. As a result, the resonance rise of the heater is reduced. Therefore, much of the undesired acoustical pulsation is eliminated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
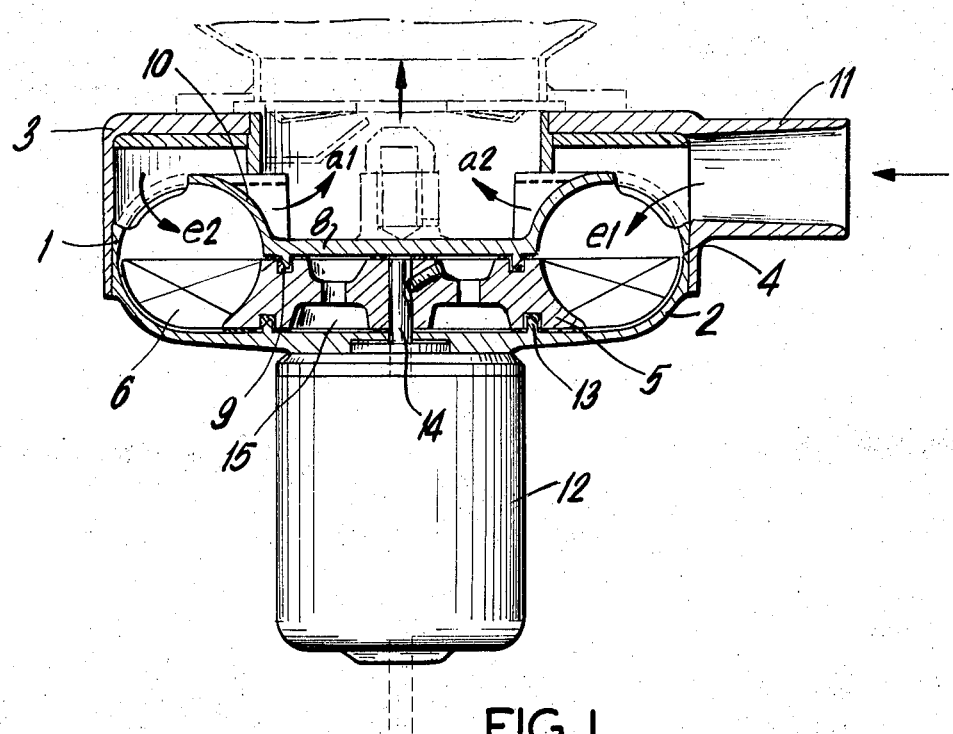
FIG. 1 is a sectional elevation of a double flow blower which does not include the switching means for switching to a single flow mode of operation.

A side channel blower in accordance with the present invention is shown in the drawings as consisting of a housing 1 which may be an extruded member or a member formed from die casting, and including a cover means having a flat section 8 upon which there may be cast, as shown in FIG. 1 in broken lines, a nipple for an atomizing nozzle. The flat section 8 is joined by a section 10 which is adapted to define the channel form. A ring 9, which is likewise formed in a casting process, serves as a labyrinth packing member 4 and an impeller member 5 is located within the housing. Arranged within the section 10 are a pair of inlet openings $e1$ and $e2$ and a pair of outlet openings $a1$ and $a2$. The outlet opening $a2$ is arranged adjacent to the inlet opening $e1$, and the outlet opening $a1$ is correspondently arranged adjacent the inlet opening $e2$. The combustion air, or other medium, entering the inlet openings $e1$ and $e2$ is introduced through the inlet channel 11 which is molded on the connecting housing 3. In order to provide for formation of the side channel, a housing 1 is configured as a cover on the impeller housing 2. The impeller housing 2 is also provided with a labyrinth packing 13 for the impeller 5. A bore is provided in a central location on the blower to enable an electro motor 12 to be secured on a shaft 14. The impeller 5, which is arranged between the housing 1 and the impeller housing 2, comprises blade means 6. The blade means 6 consists of plates which are connected to the impeller body and which are shaped and configured in the form of the interior of the impeller housing 2. Relief bores 15 are provided in the impeller body and serve to equalize pressure between the upper side and the under side of the impeller body. The air which is fed through the inlet channel 11 and which enters through the inlet openngs $e1$ and $e2$ is discharged through the outlet openings $a1$ and $a2$ and is fed therefrom through the indicated connection to a fuel operated heater (not shown).

Figure 4:
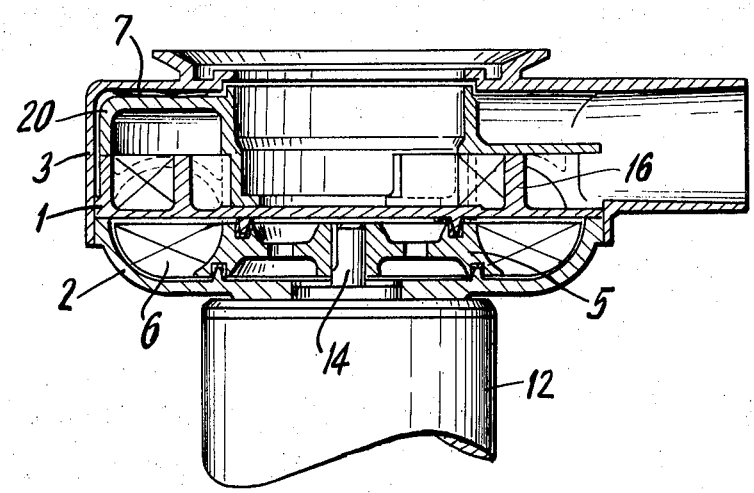
FIG. 4 is a sectional elevational of a double flow blower including means for switching to single flow operation.
Figure 5:
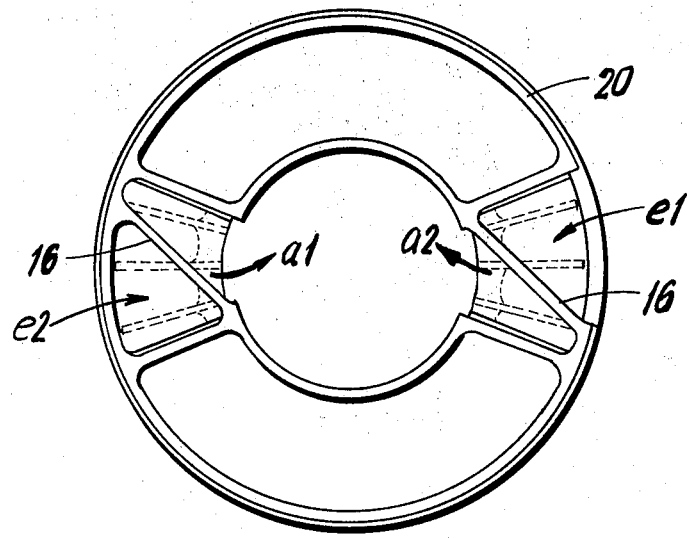
FIG. 5 is a top view of the embodiment according to FIG. 4 with the connecting housing and the switching disk removed.

In FIG. 4 there is shown an embodiment of the invention whereby the side channel blower can be switched by means of a switching disk 20 which is inserted into the connecting housing 3 and which is pressed by a leaf spring 7 upon the housing 1. A pair of web members 16 divide the channel, beneath which the blading 6 is represented in broken lines, into the inlet openings and outlet openings which are located on opposite sides thereof. In order to switch the device of the present invention from a double flow mode of operation to a single flow mode of operation, the switching disk 20 may be rotated counter-clockwise as shown in FIG. 5 in order to cover the inlet and outlet openings $a1$ and $e2$. With the switching disk 20 in this position, a single flow mode of operation will occur with inlet air passing into the inlet opening $e1$ and through the side channel around the web 16 which defines the inlet and outlet openings $a1$ and $e2$ and back through the outlet opening $a1$ to the heater.

Figure 2:
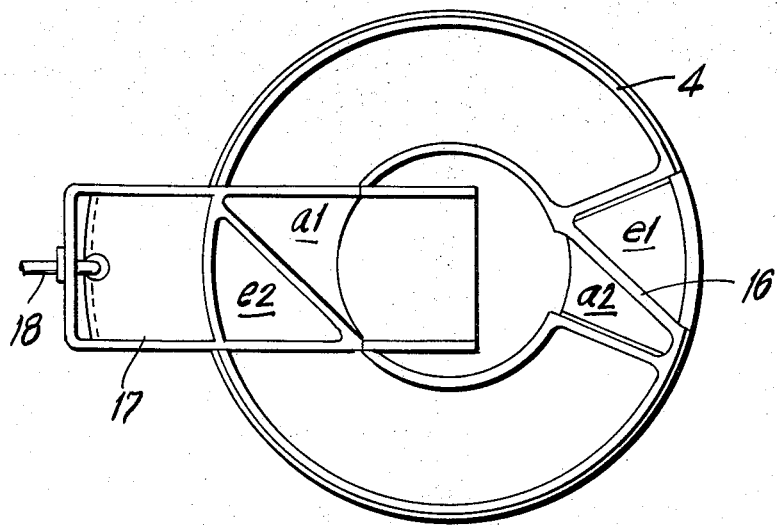
FIG. 2 is a top view of the housing of one embodiment of the invention which comprises a moving switching element.

Switching from single flow to double flow operation can also be effected in accordance with an embodiment of the invention shown in FIG. 2 which comprises a switching plate 17. The switching plate 17 is radially movable between a first and a second position and when the switching plate 17 is in the position shown in FIG. 2, a double flow arrangement occurs with air passing into the inlet openings $e1$ and $e2$ and out of the outlet openings $a2$ and $a1$. When the switching plate 17 is moved radially inwardly from the position shown in FIG. 2, the web 16 which is mounted thereon is moved out of the side channel of the blower and a continuous radial flow path is defined which enables air to flow into the inlet opening $e1$ around the side channel and out of the outlet opening $a2$.

Figure 3:
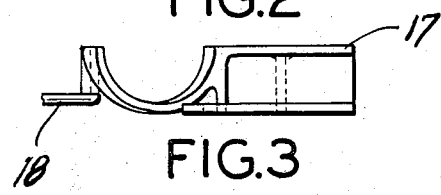
FIG. 3 is a view in perspective of the switching element of FIG. 2.

Switching of the switching plate 17 may be performed by means of a tie rod 18 which is shown in FIG. 2. FIG. 3 shows the switching plate 17 in perspective and there can be seen that portion of the plate 17 which defines the channel through which the single flow mode of operation is enabled.

Figure 6:
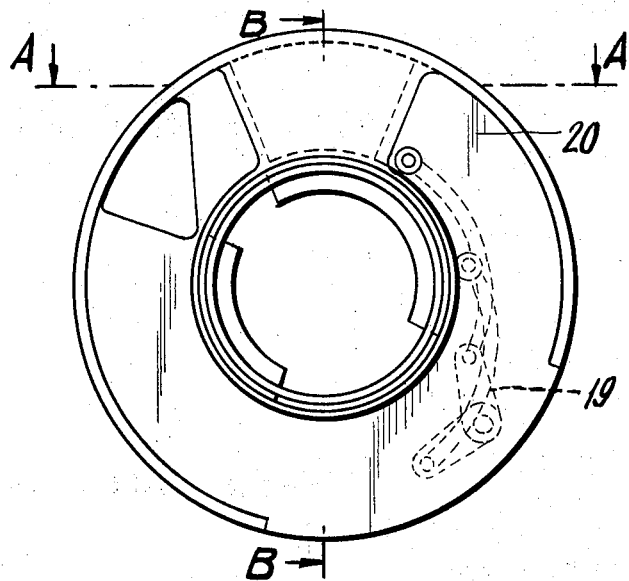
FIG. 6 is a top plan view of a blower which shows the housing with a moving diaphragm-type switching element.

FIG. 6 shows a diaphragm-type moving switching element. An operating mechanism 19 is indicated in broken lines. By operation of the mechanism 19, concentric movement of the disk 4 will enable one or several of the flow channels to be covered.

Figure 8:
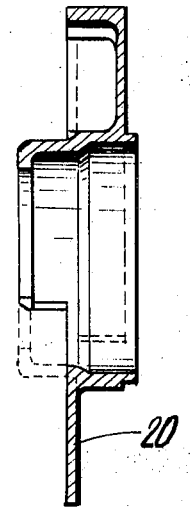
FIG. 8 is a sectional view taken along the line B—B of FIG. 6.
Figure 7:
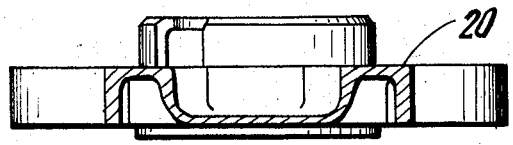
FIG. 7 is a sectional view taken along the line A—A of FIG. 6.

FIG. 7 and FIG. 8 show the switching element of FIG. 6 in a side view and in a longitudinal sectional view, respectively.

Figure 9:
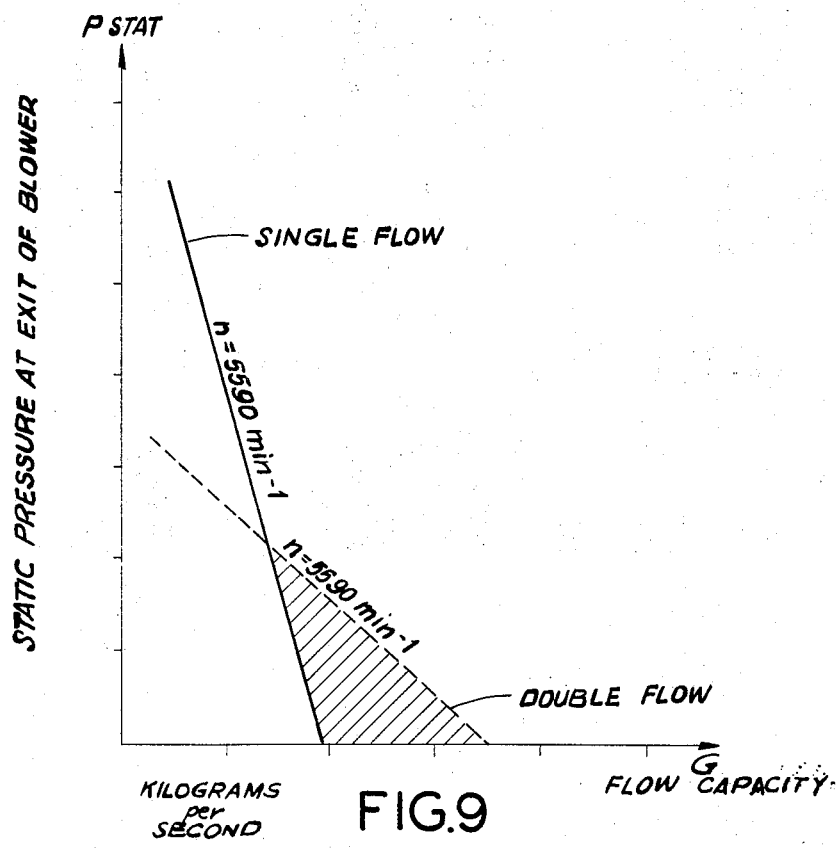
FIG. 9 is a characteristic curve plotting certain values of blower operation.

As can be seen from FIG. 9, the steep characteristic curve of the blower flattens when the blower is switched from single flow to double flow operation. A broken line diagram of FIG. 9 represents the characteristic curve for the double flow model and the solid line represents the characteristic curve for the single flow model. The hatched area in FIG. 9 shows the range extension which is possible by use of the arrangement in accordance with the present invention. The representative comparison curves between the single flow and double flow embodiment of FIG. 9 were obtained by means of test results. The number of revolutions of the lower impeller is shown as equivalent to $n = 5,590$ min.$-1$. It will be apparent that the nature of the two curves will change in dependence upon the number of revolutions involved. The curve indicates the results of a test arrived at with a measured constant blower speed of $n= 5,590$ min $-1$. P-stat is the static pressure at the exit of the blower which is dependent upon the flow capacity G which is expressed in kilograms per second.

While specific embodiments of the invention have been shown and described in detail to illustrate the application of the inventive principles, it will be understood that the invention may be embodied otherwise without departing from such principles.

What is claimed is:

1. An air blower particularly suitable for delivery of combustion air to a motor vehicle heater including side channel means through which said air is discharged from said blower comprising housing means, impeller means having fixed blades thereon operatively located within said housing for driving air through said blower, cover means formed as a portion of said housing means and defining together therewith a portion of said side channel means through which air flow is directed through said blower, and air flow guide means structurally associated with said cover means for dividing said side channel means into a plurality of distinct flow passages, said guide means including a transverse web for each of said flow passages defining on either side thereof an inlet opening and an outlet opening for each of said flow passages and closure means selectively movable between a first and a second position to block air flow through selected ones of said flow passages when in said first position and to permit air flow therethrough when in said second position, whereby said air blower may be operated to provide a selected number of air flow passages for delivering combustion air to said heater.

2. A blower according to claim 1, wherein said guide means are mounted to separate said side channel from said impeller means and include a flat plate partially covering said impeller means which operates as said closure means, and wherein said web is arranged to extend obliquely to the direction of air flow through said side channel, with said guide means being detachably mounted upon said cover means.

3. A blower according to claim 1, wherein said housing means and said cover means are formed to define said side channel means in a generally circumferential configuration extending about said blower, with said impeller means being rotatable about an axis of rotation generally centrally located relative thereto, said web means being arranged to define said inlet openings in a location more remote from said axis of rotation than the location of said outlet openings.

4. A blower according to claim 3, wherein said inlet openings are defined by the arrangement of said webs to have a generally tapering configuration which is wider on the side of said inlet openings which is more remote from said axis of rotation.

5. A blower according to claim 4, wherein said outlet openings are defined by the arrangement of said webs to have a generally tapering configuration which is wider on the side of said outlet openings closest said axis of rotation.

6. A blower according to claim 1, wherein said closure means comprise a generally arcuate plate member which is movable relative to an individual one of said webs and positionable to divert air flow about said web to block the air flow passage whose inlet and outlet openings are defined by said web.

7. A blower according to claim 1, wherein said closure menas in said web are formed in a single unitary member which is slidable between a first and a second position in a direction transverse to the direction of air flow through said side channel means, said unitary member defining an air flow passage for said blower when in said first position and rendering said air flow passage inoperative when in said second position.

8. A blower according to claim 1, wherein said cover means defines said side chanel means in a generally circumferential configuration extending about said blower, with said inpeller means being located therebelow within said housing means, said webs being arranged within said cover means to define said plurality of distinct flow passages in spaced apart circumferential locations on said cover means.

9. A blower according to claim 7, wherein said webs are arranged within said cover means to define said inlet openings in a location to receive inlet air in a direction radially inwardly of said blower, with said outlet openings being arranged and located to expel said air in a direction radially inwardly of said blower, said blower including a common outlet passage arranged to receive air flow from each of the outlet openings of an operative flow passage for delivery therefrom to said heater.

* * * * *